United States Patent
Choi et al.

(10) Patent No.: US 10,928,099 B2
(45) Date of Patent: Feb. 23, 2021

(54) BOILER WITH GAS SENSING AND EARTHQUAKE SENSING FUNCTION AND CONTROL METHOD THEREOF

(71) Applicant: KITURAMI CO., LTD., Gyeongsangbuk-do (KR)

(72) Inventors: Sung-Hwan Choi, Seoul (KR); Young-Hwan Choi, Seoul (KR)

(73) Assignee: KITURAMI CO., LTD., Cheongdo-gun (KR)

( * ) Notice: Subject to any disclaimer, the term of this patent is extended or adjusted under 35 U.S.C. 154(b) by 163 days.

(21) Appl. No.: 16/000,568

(22) Filed: Jun. 5, 2018

(65) Prior Publication Data

US 2018/0283731 A1  Oct. 4, 2018

Related U.S. Application Data

(63) Continuation of application No. PCT/KR2017/010920, filed on Sep. 29, 2017.

(30) Foreign Application Priority Data

Dec. 13, 2016  (KR) .................. 10-2016-0169227
Sep. 6, 2017  (KR) .................. 10-2017-0113811

(51) Int. Cl.
  *F24H 9/20* (2006.01)
  *G01V 1/00* (2006.01)
  *G06Q 50/30* (2012.01)
  *H04L 29/08* (2006.01)

(52) U.S. Cl.
  CPC ........... *F24H 9/205* (2013.01); *F24H 9/2035* (2013.01); *G01V 1/008* (2013.01); *G06Q 50/30* (2013.01); *H04L 67/12* (2013.01)

(58) Field of Classification Search
  CPC ........ F24H 9/205; G01V 1/008; F24G 9/2035
  See application file for complete search history.

(56) References Cited

U.S. PATENT DOCUMENTS 9,305,451 B2 * 4/2016 Liu ..................... G08B 27/008

FOREIGN PATENT DOCUMENTS

| CN | 101619776 B | * | 8/2011 |
| JP | 09060872 A | * | 3/1997 |
| JP | H10-078221 A | | 3/1998 |
| JP | 2008204240 | * | 9/2008 |
| JP | 2012-103937 A | | 5/2012 |
| JP | 2012103937 | * | 5/2012 |
| KR | 10-2001-0060885 A | | 7/2001 |
| KR | 20-0388579 Y1 | | 6/2005 |
| KR | 200388579 Y1 | * | 6/2005 |
| KR | 10-2011-0002409 A | | 1/2011 |

* cited by examiner

*Primary Examiner* — Steven S Anderson, II
(74) *Attorney, Agent, or Firm* — Studebaker & Brakett PC

(57) ABSTRACT

The present invention relates to a boiler having a gas sensing and an earthquake sensing function and a control method thereof, in which a gas leakage and an earthquake occurrence are automatically sensed and thus the boiler is forcibly stopped by causing fuel supply thereto to be cut off. The present invention is configured to cause fuel supply to the boiler to be cut off by comprehensively determining whether gas is leaking from the boiler and whether an earthquake has occurred at the present time, thereby minimizing loss of life due to the gas leakage and the earthquake occurrence.

14 Claims, 4 Drawing Sheets

BOILER WITH GAS SENSING AND EARTHQUAKE SENSING FUNCTION AND CONTROL METHOD THEREOF

CROSS-REFERENCE TO RELATED APPLICATIONS

The present application is a continuation of International Patent Application No. PCT/KR2017/010920 filed Sep. 29, 2017, which is based upon and claims the benefit of priority to Korean Patent Application No. 10-2016-0169227 filed Dec. 13, 2016 and Korean Patent Application No. 10-2017-0113811 filed Sep. 6, 2017. The disclosures of the above-listed applications are hereby incorporated by reference herein in their entirety.

TECHNICAL FIELD

The present invention relates to a boiler having a gas leakage sensing and an earthquake sensing function and a control method thereof. More particularly, the present invention relates to a boiler having a gas sensing and an earthquake sensing function and a control method thereof, in which a gas leakage and an earthquake occurrence are automatically sensed and thus the boiler is forcibly stopped by causing fuel supply thereto to be cut off.

BACKGROUND ART

Recent large-scale earthquakes in China and Japan, neighboring countries of the Korean Peninsula, have caused building collapses, as well as secondary damages due to the building collapses. The Korean peninsula is expected to have a steady increase in the number of earthquakes even though it is moderately or weakly prone earthquake region. In 2016, a magnitude-5.8 earthquake occurred in Gyeongju, and the Korean Peninsula is no longer considered to be a safe region in regards to earthquakes.

On the other hand, in Korea, underfloor heating (ondol in Korean) using a boiler is common and the boiler is installed in each household. Since the boiler uses flammable substances such as oil and gas as fuel, there is a risk that leakage of the fuel can cause injury to people and damage to property. Therefore, there is a need for a countermeasure against boiler hazards due to fuel leakage or overheating when flow and vibration of the boiler occur due to natural disasters such as an earthquake. In other words, in order to respond appropriately to earthquakes, it is important to actively manage the boiler in advance through fuel leakage prevention immediately after occurrence of an earthquake, rather than during post-disaster response after a disaster occurs.

A conventional boiler is configured such that a wired transmitter/receiver unit, a temperature sensor, a flame sensor, a low-level sensor, and an earthquake sensor are each connected to a microcomputer, and the microcomputer is connected to a fan, an ignition device, a fuel cut-off unit, a circulation pump, and an automatic water-supply device.

However, the conventional boiler is provided with only a structure for sensing gas leakage, but not provided with a structure of sensing an earthquake occurrence to cause an operation thereof or fuel supply thereto to be cut, whereby there are problems of a large explosion or a fire accident.

DISCLOSURE

Technical Problem

Accordingly, the present invention has been made keeping in mind the above problems occurring in the prior art, and an object of the present invention is to provide a boiler having a gas sensing and an earthquake sensing function and a control method thereof, in which a gas leakage and an earthquake occurrence are automatically sensed and the boiler is forcibly stopped by causing a fuel supply thereto to cut off.

Technical Solution

In order to achieve the object, the present invention provides a boiler having a gas sensing and an earthquake sensing function, the boiler including: a boiler body receiving a fuel and generating flame; a fuel cut-off unit receiving a cut-off signal to cause fuel supply to the boiler body to be cut off; and a gas sensor provided in the boiler body to sense gas and generate a gas sensing signal; an earthquake sensor provided in the boiler body to sense an earthquake and generate an earthquake sensing signal; a gas concentration determiner receiving the gas sensing signal from the gas sensor to determine a gas concentration; an earth sensitivity determiner receiving the earthquake sensing signal from the earthquake sensor to determine an earthquake sensitivity; and controller transmitting the cut-off signal to the fuel cut-off unit according to the gas concentration determined by the gas concentration determiner, or transmitting the cut-off signal to the fuel cut-off unit according to the earthquake sensitivity determined by the earthquake sensitivity determiner.

The boiler further includes an input unit inputting a sampling period into the controller, in which the controller sets an allowable gas concentration range by accumulating the gas concentration determined by the gas concentration determiner during the sampling period input by the input unit, and transmits the cut-off signal to the fuel cut-off unit when the gas concentration determined by the gas concentration determiner is out of the allowable gas concentration range after the sampling period.

The boiler further includes an input unit inputting a sampling period into the controller, in which the controller sets an allowable earthquake sensitivity range by accumulating the earthquake sensitivity determined by the earthquake sensitivity determiner during the sampling period input by the input unit, and transmits the cut-off signal to the fuel cut-off unit when the earthquake sensitivity determined by the earthquake sensitivity determiner is out of the allowable earthquake sensitivity range after the sampling period.

Further, the controller may be configured to compare whether or not the gas concentration determined by the gas concentration determiner is out of a predetermined allowable gas concentration range, count the number of times that the gas concentration determined by the gas concentration determiner is out of the predetermined allowable gas concentration range according to the comparison result, and transmit the cut-off signal to the fuel cut-off unit when the number of times is greater than a preset number of times; or compare whether or not the earthquake sensitivity determined by the earthquake sensitivity determiner is out of a predetermined allowable earthquake sensitivity range, count the number of times that the earthquake sensitivity determined by the earthquake sensitivity determiner is out of the predetermined allowable earthquake sensitivity range according to the comparison result, and transmit the cut-off signal to the fuel cut-off unit when the number of times is greater than a preset number of times.

Further, the controller may be configured to compare whether or not the gas concentration determined by the gas concentration determiner is out of a predetermined allowable gas concentration range, and transmit the cut-off signal to the fuel cut-off unit when a situation that the gas concentration determined by the gas concentration determiner is out of the predetermined allowable gas concentration range lasts for a preset period of time according to the comparison result; or compare whether or not the earthquake sensitivity determined by the earthquake sensitivity determiner is out of a predetermined allowable earthquake sensitivity range, and transmit the cut-off signal to the fuel cut-off unit when a situation that the earthquake sensitivity determined by the earthquake sensitivity determiner is out of the predetermined allowable earthquake sensitivity range lasts for a preset period of time according to the comparison result.

The boiler further includes an output unit receiving the cut-off signal from the controller to output the signal to the outside, in which the controller transmits the cut-off signal to the fuel cut-off unit and the output unit when the gas concentration determined by the gas concentration determiner is out of a predetermined allowable gas concentration range, or transmits the cut-off signal to the fuel cut-off unit and the output unit when the earthquake sensitivity determined by the earthquake sensitivity determiner is out of a predetermined allowable earthquake sensitivity range.

Further, the output unit may be provided in a room temperature controller that is installed in a room to control a temperature of the boiler body.

Further, the earthquake sensor may include a 3-axis acceleration sensor.

In addition, the present invention provides a method of controlling a boiler having a gas sensing and an earthquake sensing function, the method including: a gas concentration determination step receiving a gas sensing signal from a gas sensor provided in a boiler body and determining a gas concentration, by a gas concentration determiner; a first comparison step comparing whether or not the gas concentration transmitted from the gas concentration determiner is out of a predetermined allowable gas concentration range, by a controller; a first cut-off step transmitting, by the controller, a cut-off signal to a fuel cut-off unit to cause fuel supply to the boiler body to be cut off when the gas concentration transmitted from the gas concentration determiner is out of the predetermined allowable gas concentration range; an earthquake sensitivity determination step receiving an earthquake sensing signal from an earthquake sensor provided in the boiler body and determining an earthquake sensitivity, by an earthquake sensitivity determiner; a second comparison step comparing, by the controller, whether or not the earthquake sensitivity transmitted from the earthquake sensitivity determiner is out of a predetermined allowable earthquake sensitivity range; and a second cut-off step transmitting, by the controller, the cut-off signal to the fuel cut-off unit to cause fuel supply to the boiler body to be cut off when the earthquake sensitivity transmitted from the earthquake sensitivity determiner is out of the predetermined allowable earthquake sensitivity range.

The method further includes a first input step receiving, by the controller, a sampling period from an input unit before the gas concentration determination step, in which a first setting step setting the allowable gas concentration range by accumulating the gas concentration determined by the gas concentration determiner during the sampling period is further included between the gas concentration determination step and the first comparison step.

The method further includes a second input step receiving, by the controller, a sampling period from an input unit before the earthquake sensitivity determination step, in which a second setting step setting the allowable earthquake sensitivity range by accumulating the earthquake sensitivity determined by the earthquake sensitivity determiner during the sampling period is further included between the earthquake sensitivity determination step and the second comparison step.

Further, the first cut-off step may include counting, by the controller, the number of times that the gas concentration determined by the gas concentration determiner is out of the predetermined allowable gas concentration range when the gas concentration determined by the gas concentration determiner is out of the predetermined allowable gas concentration range; and transmitting, by the controller, the cut-off signal to the fuel cut-off unit when the number of times is greater than a preset number of times, and the second cut-off step may include counting, by the controller, the number of times that the earthquake sensitivity determined by the earthquake sensitivity determiner is out of the predetermined allowable earthquake sensitivity range when the earthquake sensitivity determined by the earthquake sensitivity determiner is out of the predetermined allowable earthquake sensitivity range; and transmitting, by the controller, the cut-off signal to the fuel cut-off unit when the number of times is greater than a preset number of times.

Further, the first cut-off step may include determining, by the controller, whether a situation that the gas concentration determined by the gas concentration determiner is out of the predetermined allowable gas concentration range lasts for a preset period of time when the gas concentration determined by the gas concentration determiner is out of the predetermined allowable gas concentration range; and transmitting, by the controller, the cut-off signal to the fuel cut-off unit when the situation that the gas concentration determined by the gas concentration determiner is out of the predetermined allowable gas concentration range lasts for the preset period of time, and the second cut-off step may include determining, by the controller, whether a situation that the earthquake sensitivity determined by the earthquake sensitivity determiner is out of the predetermined allowable earthquake sensitivity range lasts for a preset period of time when the earthquake sensitivity determined by the earthquake sensitivity determiner is out of the predetermined allowable earthquake sensitivity range; and transmitting, by the controller, the cut-off signal to the fuel cut-off unit when the situation that the earthquake sensitivity determined by the earthquake sensitivity determiner is out of the predetermined allowable earthquake sensitivity range lasts for the preset period of time.

Further, the controller is configured to transmit the cut-off signal to the output unit provided in a room temperature controller, when the cut-off signal is transmitted to the fuel cut-off unit in the first cut-off step or the second cut-off step.

Advantageous Effects

The present invention is configured to cause fuel supply to the boiler to be cut off by comprehensively determining whether gas is leaking from the boiler and whether an earthquake has occurred at the present time, thereby minimizing loss of life due to the gas leakage and the earthquake occurrence.

In addition, the present invention is configured to count the number of times that the gas concentration determined by the gas concentration determiner is out of the predetermined allowable gas concentration range and the number of times that the earthquake sensitivity determined by the earthquake sensitivity determiner is out of the predetermined allowable earthquake sensitivity range, so that the fuel supplied to the boiler body is controlled not to be cut off when the gas is temporarily out of the allowable gas concentration range or the allowable earthquake sensitivity range only once due to gas or shock applied from the outside, whereby there is an advantage of providing improved reliability of fuel cut-off.

In addition, the present invention is configured to check the time when the gas concentration determined by the gas concentration determiner is out of the predetermined allowable gas concentration range, and the time when the earthquake sensitivity determined by the earthquake sensitivity determiner is out of the allowable earthquake sensitivity range, so that although the gas concentration or the earthquake sensitivity is temporarily out of the allowable gas concentration range or the allowable earthquake sensitivity range due to gas or shock applied from the outside, it is possible to recognize it as a malfunction and cause the fuel supply to the boiler body not to be cut off, whereby there is an advantage of providing improved reliability of fuel cut-off.

In addition, since the output unit is provided in the room temperature controller, the user can quickly know whether gas has leaked from the boiler or an earthquake has occurred through the output unit provided in the room temperature controller.

In addition, when a guidance image, a guidance message, or a light output from the output unit is caused by an earthquake, there is an advantage that the user may rapidly recognize that an earthquake has occurred to enable him or her to rapidly get away from the building.

DESCRIPTION OF THE REFERENCE NUMERALS IN THE DRAWING

Figure 1:
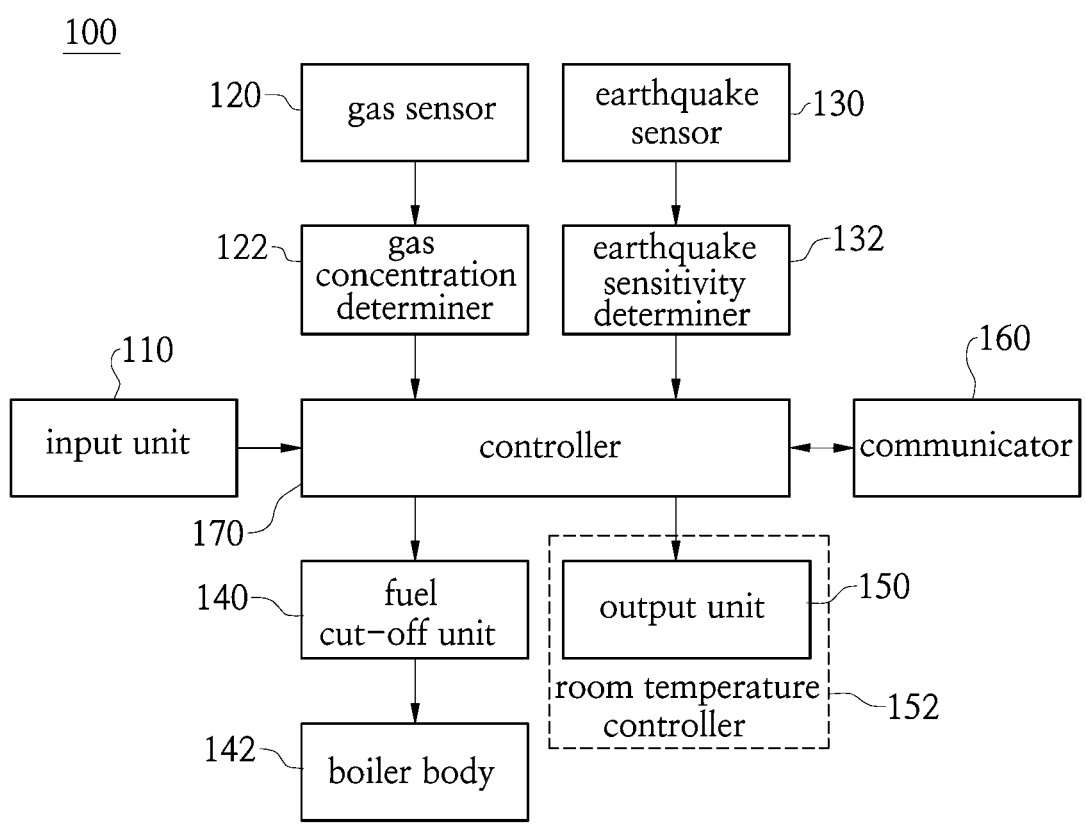
FIG. 1 is a block diagram schematically illustrating a boiler having a gas sensing and earthquake sensing function according to a preferred embodiment of the present invention.

100: Boiler having a gas sensing and an earthquake sensing function
110: input unit 120: gas sensor
122: gas concentration determiner 130: earthquake sensing sensor
132: earthquake sensitivity determiner 140: fuel cut-off unit
142: boiler body 150: output unit
152: room temperature controller 160: communicator
170: controller

BEST MODE

Hereinafter, a boiler having a gas sensing and an earthquake sensing function and a control method thereof according to a preferred embodiment of the present invention will be described in detail with reference to the accompanying drawings.

FIG. 1 is a block diagram schematically illustrating a boiler having a gas sensing and an earthquake sensing function according to a preferred embodiment of the present invention.

Referring to FIG. 1, a boiler 100 having a gas sensing and an earthquake sensing function according to a preferred embodiment of the present invention includes a boiler body 142, a fuel cut-off unit 140, a gas sensor 120, an earthquake sensor 130, a gas concentration determiner 122, an earthquake sensitivity determiner 132, and a controller 170, and may further include an input unit 110, a communicator 160, and an output unit 150.

The boiler body 142 is installed in a building to serve as a boiler, and is provided to receive gaseous fuel such as liquefied petroleum gas (LPG) or liquefied natural gas (LNG) to generate flames and use the flames for generating hot water or for heating a room.

The fuel cut-off unit 140 is configured to receive a cut-off signal from the controller 170 that will be described later, and thus cut off the gaseous fuel supply to the boiler body 142.

The gas sensor 120 is mounted in one side of the boiler body 142, in which the gas sensor 120 senses gas fuel leaking from the boiler body 142 and thus generates a gas sensing signal. That is, when the gas leaks due to insufficient inspection of a connection portion of a gas pipeline, the gas sensor 120 senses the gas leakage. The gas sensor 120 includes, for example, a suction unit (not shown) for allowing air to be constantly sucked therein, and a detector (not shown) for allowing gas to be sensed from the sucked air and thus generating a gas sensing signal, in which the detector is made up of a typical photo-ionization detector, an electrochemical detector, a contact detector, and the like.

The gas concentration determiner 122 receives the gas sensing signal from the gas sensor 120 to determine gas concentration. When the gas sensor 120 senses gas, a minute change in current occurs, whereby the gas concentration determiner 122 may determine the gas concentration via the change.

The earthquake sensor 130 may be mounted in the other side within the boiler body 142 to sense a ground shaking phenomenon, that is, an earthquake. The earthquake sensor 130 may include, for example, a three-axis acceleration sensor. This earthquake sensor 130 may record and store acceleration data for the sensed vibration in three axial directions. Here, three-axis means that vibration in up and down directions, left and right directions, and front and rearward directions, and acceleration due to the vibration may be measured.

The earthquake sensitivity determiner 132 analyzes an earthquake sensing signal transmitted from the earthquake sensor 130, that is, acceleration data, to determine the earthquake sensitivity. The earthquake sensitivity may is based on, for example, a Modified Mercalli Intensity Scale or may be expressed by digitizing the acceleration data.

The controller 170 transmits a cut-off signal to the fuel cut-off unit 140 according to the gas concentration determined by the gas concentration determiner 122 or the earthquake sensitivity determined by the earthquake sensitivity determiner 132. That is, the controller 170 transmits the cut-off signal to the fuel cut-off unit 140 to cut off the fuel supply to the boiler body 142, when the gas concentration transmitted from the gas concentration determiner 122 is out of an allowable gas concentration range that is predetermined. The controller 170 transmits a cut-off signal to the fuel cut-off unit 140 to cut off the fuel supply to the boiler body 142, when the earthquake sensitivity transmitted from the earthquake sensitivity determiner 132 is out of an allowable earthquake sensitivity range that is predetermined. As described above, the present invention is configured to determine whether the gas is leaking from the boiler body 142 and whether or not an earthquake has occurred and thus cut off the fuel supply to the boiler body 142, whereby there is an advantage of minimizing casualties caused by gas leakage and earthquakes.

Herein, the cut-off signal generated by the controller 170 when the gas concentration determined by the gas concentration determiner 122 is out of the allowable gas concentration range, and the cut-off signal generated by the controller 170 when the earthquake sensitivity determined by the earthquake sensitivity determiner 132 is out of the allowable earthquake sensitivity range may be set to be equal to each other or different from each other.

In addition, the controller 170 is configured to compare whether or not the gas concentration determined by the gas concentration determiner 122 is out of the predetermined allowable gas concentration range, and count the number of times that the gas concentration determined by the gas concentration determiner 122 is out of the predetermined allowable gas concentration range according to the comparison result, and transmit the cut-off signal to the fuel cut-off unit 140 when the number of times is greater than a preset number of times, for example, two times. Similarly, the controller 170 is configured to compare whether the earthquake sensitivity determined by the earthquake sensitivity determiner 132 is out of the predetermined allowable earthquake sensitivity range, and count the number of times that the earthquake sensitivity determined by the earthquake sensitivity determiner 132 is out of the predetermined allowable earthquake sensitivity range according to the comparison result, and transmit the cut-off signal to the fuel cut-off unit 140 when the number of times is greater than a preset number of times, for example, two times.

Since the present invention is configured to count the number of times that the gas concentration determined by the gas concentration determiner 122 is out of the predetermined allowable gas concentration range, and count the number of times that the earthquake sensitivity determined by the earthquake sensitivity determiner 132 is out of the predetermined allowable earthquake sensitivity range, the fuel supplied to the boiler body 142 is controlled not to be cut off when the gas is temporarily out of the allowable gas concentration range or the allowable earthquake sensitivity range only once due to gas or shock applied from the outside, whereby there is an advantage of providing improved reliability of fuel cut-off.

In addition, the controller 170 is configured to compare whether or not the gas concentration determined by the gas concentration determiner 122 is out of the predetermined allowable gas concentration range, and transmit the cut-off signal to the fuel cut-off unit 140 when a situation that the gas concentration determined by the gas concentration determiner 122 is out of the predetermined allowable gas concentration range lasts for a preset period of time, for example, 10 seconds, according to the comparison result. In addition, the controller 170 is configured to compare whether or not the earthquake sensitivity determined by the earthquake sensitivity determiner 132 is out of the predetermined allowable earthquake sensitivity range, and transmit the cut-off signal to the fuel cut-off unit 140 when a situation that the earthquake sensitivity determined by the earthquake sensitivity determiner 122 is out of the predetermined allowable earthquake sensitivity range lasts for a preset period of time, for example, 10 seconds, according to the comparison result.

As such, the present invention is configured to check the time when the gas concentration determined by the gas concentration determiner 122 is out of the predetermined allowable gas concentration range, and the time when the earthquake sensitivity determined by the earthquake sensitivity determiner 132 is out of the allowable earthquake sensitivity range, so that although the gas concentration or the earthquake sensitivity is temporarily out of the allowable gas concentration range or the allowable earthquake sensitivity range due to gas or shock applied from the outside, it is possible to recognize it as a malfunction and cause the fuel supply to the boiler body 142 not to be cut off, whereby there is an advantage of providing improved reliability of fuel cut-off.

The input unit 110 is configured to input a sampling period into the controller 170 by means of numerical values or the like. The sampling period is a time interval for which the controller 170 sets the allowable gas concentration range and the allowable earthquake sensitivity range. The controller 170 sets the allowable gas concentration range by accumulating the gas concentration determined by the gas concentration determiner 122 during the sampling period input by the input unit 110, and sets the allowable earthquake sensitivity range by accumulating the earthquake sensitivity determined by the earthquake sensitivity determiner 132 during the sampling period input by the input unit 110. Herein, before inputting the sampling period into the input unit 110, a user needs to check whether the gas is currently leaking by testing the gas pipeline for leaks using soapy water, and whether or not an earthquake has occurred via news or the like.

The communicator 160 performs communication with the outside, and may be omitted in some cases. The communicator 160 is configured to enable wireless or wired communication with a designated external service center, a user's terminal, or the like. The controller 170 transmits a cut-off signal to a service center and a user's terminal through the communicator 160, so that it is possible to rapidly inform the outside of whether the fuel supply to the boiler body 142 is cut off.

The output unit 150 includes a display, a speaker, a lamp, and the like, and receives the cut-off signal from the controller 170 to allow it to be output to the outside by means of a guidance image, a guidance message, or a light. The output unit 150 may be installed inside a building, for example, in a living room or a room, and may be provided in a typical room temperature controller 152 that enables controls of temperature, operating time, on/off and the like of the boiler body 142. Herein, since the room temperature controller 152 is installed in a living room or a room in which it is more visible to the user, there is an advantage that the user may rapidly check whether the gas has leaked from the boiler body 142 or whether the earthquake has occurred through the output unit 150 installed in the room temperature controller 152. In particular, when a guidance image, a guidance message, or a light output from the output unit 150 is caused by an earthquake, there is an advantage that the user may rapidly recognize that the earthquake has occurred to enable him or her to rapidly get away from the building.

Hereinafter, a method of controlling a boiler having a gas sensing and earthquake sensing function according to a preferred embodiment of the present invention will be described.

Figure 2:
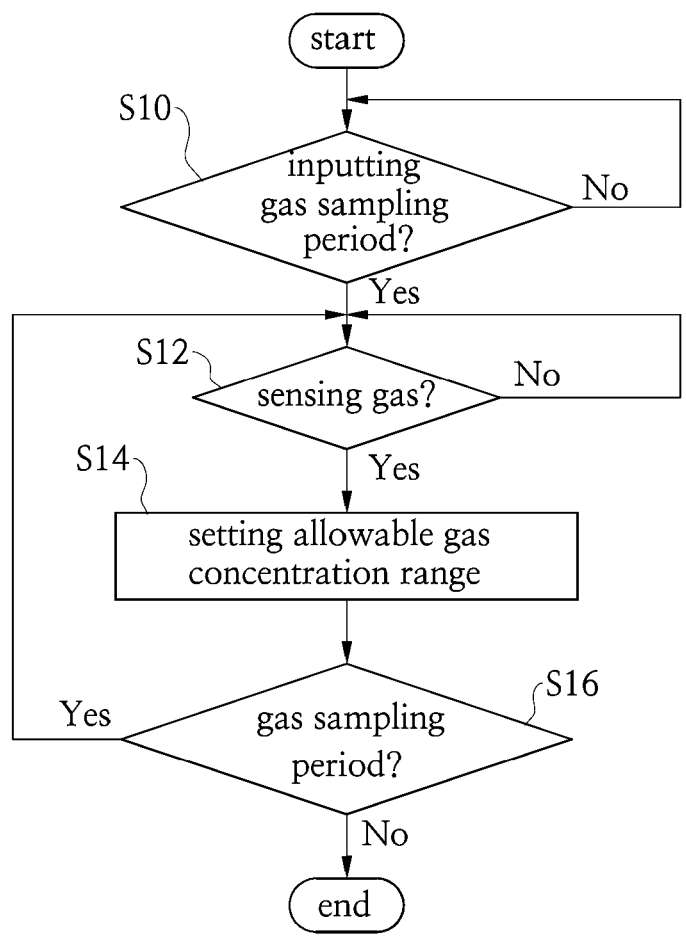
FIG. 2 is a flowchart schematically illustrating a process of setting an allowable gas concentration range in a method of controlling a boiler having a gas sensing and an earthquake sensing function according to a preferred embodiment of the present invention.

FIG. 2 is a flowchart schematically illustrating a process of setting an allowable gas concentration range in a method of controlling a boiler having a gas sensing and earthquake sensing function according to a preferred embodiment of the present invention.

Referring to FIG. 2, first, the controller 170 determines whether a gas sampling period is input from the input unit 110 (S10). When the gas sampling period is input from the input unit 110, the controller 170 determines whether the gas concentration is transmitted from the gas concentration determiner 122 (S12). When the gas concentration is transmitted as a result of the determination, the controller 170 sets an allowable gas concentration range by accumulating the gas concentration determined by the gas concentration determiner 122 (S14). That is, the controller 170 extracts the lowest value and the highest value from among the accumulated gas concentrations determined by the gas concentration determiner 122 to set the allowable gas concentration range. Subsequently, the controller 170 determines whether it is still in the gas sampling period (S16), and then the process goes back to step S12 when it is determined to be in the gas sampling period.

Figure 3:
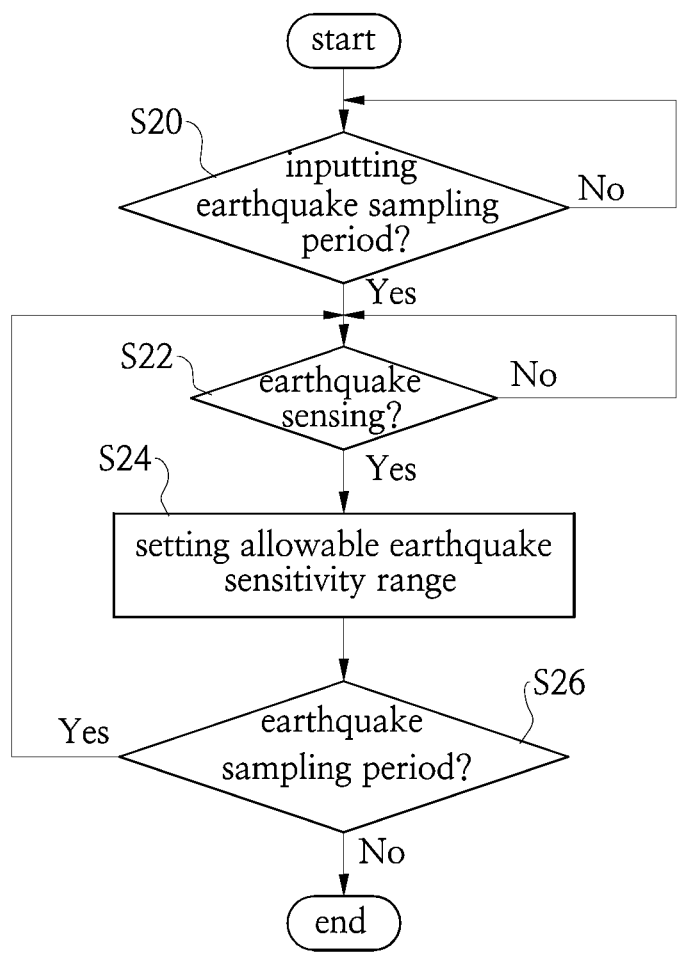
FIG. 3 is a flowchart schematically illustrating a process of setting an allowable earthquake sensitivity range in a method of controlling a boiler having a gas sensing and an earthquake sensing function according to a preferred embodiment of the present invention.

FIG. 3 is a flowchart schematically illustrating a process of setting an allowable earthquake sensitivity range in a method of controlling a boiler having a gas sensing and earthquake sensing function according to a preferred embodiment of the present invention.

Referring to FIG. 3, first, the controller 170 determines whether an earthquake sampling period is input from the input unit 110 (S20). When the earthquake sampling period is input from the input unit 110, the controller 170 determines whether the earthquake sensitivity is transmitted from the earthquake sensitivity determiner 132 (S22). When the earthquake sensitivity is transmitted as a result of the determination, the controller 170 sets an allowable earthquake sensitivity range by accumulating the earthquake sensitivity determined by the earthquake sensitivity determiner 132 (S24). That is, the controller 170 extracts the lowest value and the highest value from among the accumulated gas concentrations determined by the earthquake sensitivity determiner 132 to set the allowable earthquake sensitivity range. Subsequently, the controller 170 determines whether it is still in the earthquake sampling period (S26), and then the process goes back to step S22 when it is determined to be in the earthquake sampling period.

Figure 4:
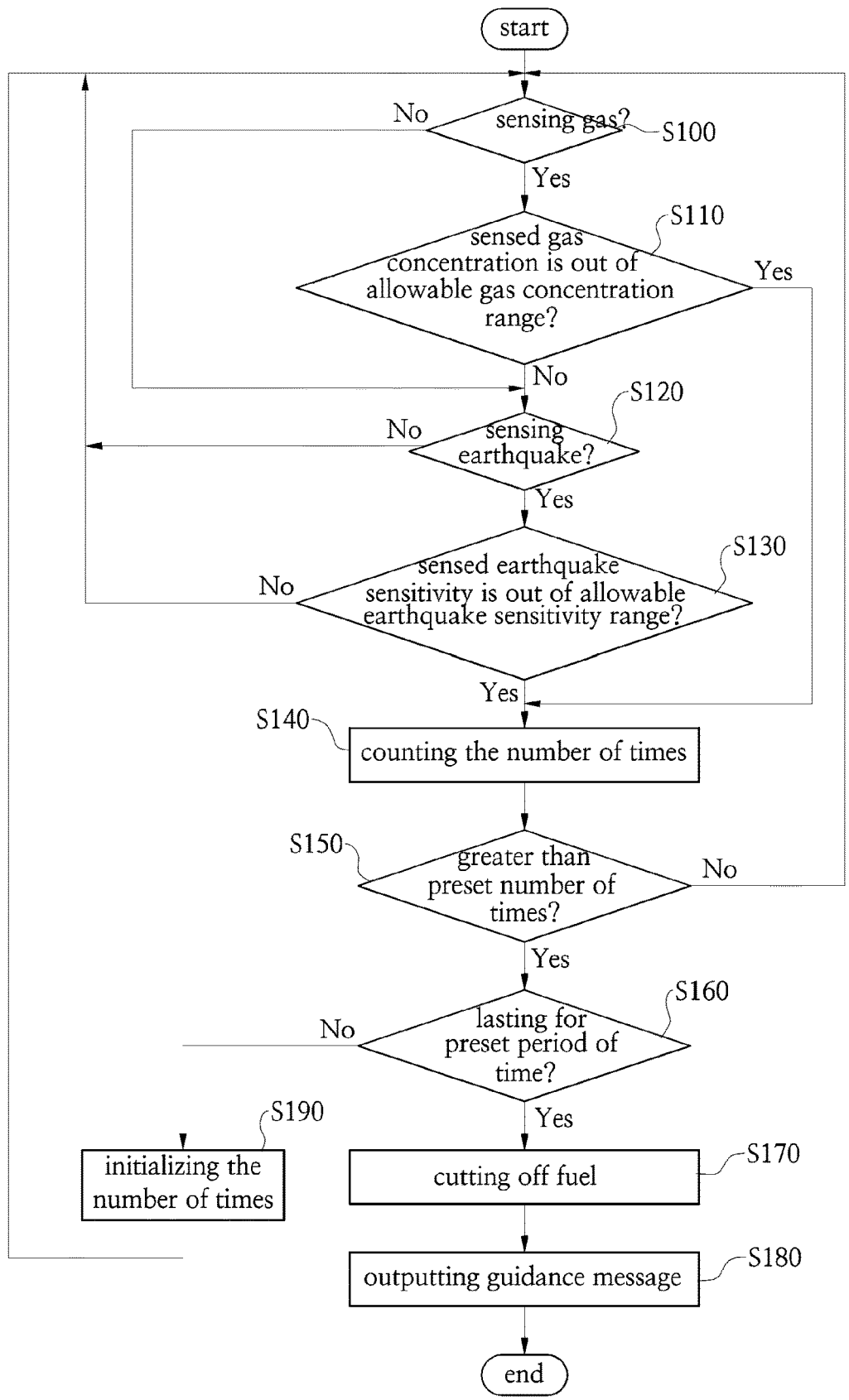
FIG. 4 is a flowchart schematically illustrating a process of sensing gas and earthquake using a method of controlling a boiler having a gas sensing and an earthquake sensing function according to a preferred embodiment of the present invention.

FIG. 4 is a flowchart schematically illustrating a process of sensing a gas and an earthquake using a method of controlling a boiler having a gas sensing and earthquake sensing function according to a preferred embodiment of the present invention.

Referring to FIG. 4, the gas concentration determiner 122 determines the gas concentration from the gas sensing signal and transmits the determination result to the controller 170 when the gas sensing signal is received from the gas sensor 120 provided in the boiler body 142 (S100). Thereafter, the controller 170 compares whether or not the gas concentration determined by the gas concentration determiner 122 is out of an allowable gas concentration range that is predetermined (S110), and counts the number of times that the gas concentration determined by the gas concentration determiner 122 is out of the predetermined allowable gas concentration range when the gas concentration determined by the gas concentration determiner 122 is out of the predetermined allowable gas concentration (S140). Subsequently, when the number of times is greater than a preset number of times (S150), the controller 170 determines whether a situation that the gas concentration determined by the gas concentration determiner 122 is out of the predetermined allowable gas concentration range lasts for a preset period of time, for example, 10 seconds (S160). As a result of determination, when a situation that the gas concentration determined by the gas concentration determiner 132 is out of the predetermined allowable gas concentration range lasts for a preset period of time, for example, 10 seconds, the controller 170 transmits the cut-off signal to the fuel cut-off unit 140 to cause the fuel supply to the boiler body 142 to be cut off (S170). Subsequently, the controller 170 allows the output unit 150 to output a message such as "gas leaked", so that the user may easily know whether the gas currently leaks or not (S180). When it is determined in step S150 that the number of times is less than the preset number, the controller 170 proceeds to step S100. When the situation that the gas concentration determined by the gas concentration determiner 122 is out of the allowable gas concentration range lasts for a short time of about 5 seconds, the controller 170 initializes the number of times counted in step 140 (S190), and then the process goes back to step S100.

In the case that the gas concentration determined by the gas concentration determiner 122 is not out of the predetermined allowable gas concentration range in step S110, when the earthquake sensitivity determiner 132 receives the earthquake sensing signal from the earthquake sensor 130 provided in the boiler body 142, the earthquake sensitivity determiner 132 determines the earthquake sensitivity from the earthquake sensing signal, and transmits the determination result to the controller 170 (S120). Thereafter, the controller 170 compares whether or not the earthquake sensitivity determined by the earthquake sensitivity determiner is out of the predetermined allowable earthquake sensitivity range (S130), so that when the earthquake sensitivity determined by the earthquake sensitivity determiner 132 is out of the predetermined allowable earthquake sensitivity range, the controller 170 counts the number of times that the earthquake sensitivity determined by the earthquake sensitivity determiner 132 is out of the predetermined allowable earthquake sensitivity range (S140). Subsequently, when the number of times is greater than the preset number of times (S150), the controller 170 determines whether the situation that the earthquake sensitivity determined by the earthquake sensitivity determiner 132 is out of the predetermined allowable earthquake sensitivity range lasts for a preset period of time, for example, 10 seconds (S160). As a result of the determination, when the situation that the earthquake sensitivity determined by the earthquake sensitivity determiner 132 is out of the predetermined allowable earthquake sensitivity range lasts for a preset period of time, for example, 10 seconds, the controller 170 transmits a cut-off signal to the fuel cut-off unit 140, thereby causing the fuel supply to the boiler body 142 (S170) to be cut off. Subsequently, the controller 170 allows a message such as "an earthquake occurred" to be output using the output unit 150, so that the user may easily know whether or not an earthquake has currently occurred. When it is determined in step S150 that the number of times is less than the preset number, the controller 170 proceeds to step S100. When the situation that the controller 170 determines that the earthquake sensitivity determined by the earthquake sensitivity determiner 132 is out of the predetermined allowable earthquake sensitivity range lasts for short time of 5 seconds in step S160, the controller 170 initializes the number of times counted in step S140 (S190), and then the process goes back to step S100.

The invention claimed is:

1. A boiler having a gas sensing and an earthquake sensing function, the boiler comprising:
    a boiler body receiving a fuel and generating flame;
    a gas sensor provided in the boiler body to sense gas and generate a gas sensing signal;
    an earthquake sensor provided in the boiler body to sense an earthquake and generate an earthquake sensing signal;
    a controller configured to
    generate, in response to a gas concentration determined based on the gas sensing signal generated by the gas sensor, or in response to an earthquake sensitivity determined based on the earthquake sensing signal generated by the earthquake sensor, a cut-off signal configured to cut off fuel supply to the boiler body,
    wherein the controller is further configured to
        receive, from a user, a sampling period,
        accumulate, for the sampling period, the gas concentration determined based on the gas sensing signal generated by the gas sensor,
        extract a lowest value and a highest value from among the accumulated gas concentrations,
        set an allowable gas concentration range based on the extracted lowest value and highest value, and
        determine, after the sampling period, whether to generate the cut-off signal based on the allowable gas concentration range.

2. A boiler having a gas sensing and an earthquake sensing function, the boiler comprising:
    a boiler body receiving a fuel and generating flame;
    a gas sensor provided in the boiler body to sense gas and generate a gas sensing signal;
    an earthquake sensor provided in the boiler body to sense an earthquake and generate an earthquake sensing signal;
    a controller configured to generate, in response to a gas concentration determined based on the gas sensing signal generated by the gas sensor, or in response to an earthquake sensitivity determined based on the earthquake sensing signal generated by the earthquake sensor, a cut-off signal configured to cut off fuel supply to the boiler body,
    wherein the controller is further configured to
        receive, from a user, a sampling period,
        accumulate, for the sampling period, the earthquake sensitivity determined based on the earthquake sensing signal generated by the earthquake sensor,
        extract a lowest value and a highest value from among the accumulated earthquake sensitivities,
        set an allowable earthquake sensitivity range based on the extracted lowest value and highest value, and
        determine, after the sampling period, whether to generate the cut-off signal based on the allowable earthquake sensitivity range.

3. The boiler according to claim 1, wherein the controller is configured to
    compare whether or not the gas concentration determined based on the gas sensing signal generated by the gas sensor is out of the allowable gas concentration range, count the number of times that the gas concentration determined based on the gas sensing signal generated by the gas sensor is out of the allowable gas concentration range, and
    generate the cut-off signal when the number of times is greater than a preset number of times.

4. The boiler according to claim 1, wherein the controller is configured to
    compare whether or not the gas concentration determined based on the gas sensing signal generated by the gas sensor is out of the allowable gas concentration range, and
    generate the cut-off signal when a situation that the gas concentration determined based on the gas sensing signal generated by the gas sensor is out of the allowable gas concentration range lasts for a preset period of time.

5. The boiler according to claim 1, wherein the controller is configured to transmit the cut-off signal to a room temperature controller that is installed in a room to control a temperature of the boiler body.

6. The boiler according to claim 1, wherein the earthquake sensor includes a 3-axis acceleration sensor.

7. A method of controlling a boiler having a gas sensing and an earthquake sensing function, the method comprising:
    receiving a gas sensing signal from a gas sensor provided in a boiler body and determining a gas concentration based on the gas sensing signal generated by the gas sensor,
    receiving an earthquake sensing signal from an earthquake sensor provided in a boiler body and determining an earthquake sensitivity based on the earthquake sensing signal generated by the earthquake sensor;
    receiving, from a user, a sampling period;
    accumulating, for the sampling period, the gas concentration determined based on the gas sensing signal generated by the gas sensor, and the earthquake sensitivity determined based on the earthquake sensing signal generated by the earthquake sensor;
    extracting a lowest value and a highest value from among the accumulated gas concentrations, and setting an allowable gas concentration range based on the extracted lowest value and highest value among the accumulated gas concentrations;
    extracting a lowest value and a highest value from among the accumulated earthquake sensitivities, and setting an allowable earthquake sensitivity range based on the extracted lowest value and highest value among the accumulated earthquake sensitivities;
    determining, after the sampling period, whether or not the gas concentration determined based on the gas sensing signal generated by the gas sensor is out of the allowable gas concentration range;
    determining, after the sampling period, whether or not the earthquake sensitivity determined based on the earthquake sensing signal generated by the earthquake sensor is out of the allowable earthquake sensitivity range; and
    generating, a cut-off signal configured to cut off fuel supply to the boiler body when the gas concentration determined based on the gas sensing signal generated by the gas sensor is out of the allowable gas concentration range or when the earthquake sensitivity determined based on the earthquake sensing signal generated by the earthquake sensor is out of the allowable earthquake sensitivity range.

8. The method according to claim 7, wherein the generating the cut-off signal comprises:
counting the number of times that the gas concentration determined based on the gas sensing signal generated by the gas sensor is out of the allowable gas concentration range, and generating the cut-off signal when the number of times is greater than a first preset number of times; and
counting the number of times that the earthquake sensitivity determined based on the earthquake sensing signal generated by the earthquake sensor is out of the allowable earthquake sensitivity range, and generating the cut-off signal when the number of times is greater than a second preset number of times.

9. The method according to claim 7, wherein the generating the cut-off signal comprises:
determining whether a situation that the gas concentration determined based on the gas sensing signal generated by the gas sensor is out of the allowable gas concentration range lasts for a first preset period of time, and generating the cut-off signal when the situation that the gas concentration determined based on the gas sensing signal generated by the gas sensor is out of the allowable gas concentration range lasts for the first preset period of time; and
determining whether a situation that the earthquake sensitivity determined based on the earthquake sensing signal generated by the earthquake sensor is out of the allowable earthquake sensitivity range lasts for a second preset period of time, and generating the cut-off signal when the situation that the earthquake sensitivity determined based on the earthquake sensing signal generated by the earthquake sensor is out of the allowable earthquake sensitivity range lasts for the second preset period of time.

10. The method according to claim 7, further comprising:
transmitting, when the cut-off signal is generated, the cut-off signal to a room temperature controller that is installed in a room to control a temperature of the boiler body.

11. The boiler according to claim 2, wherein the controller is configured to
compare whether or not the earthquake sensitivity determined based on the earthquake sensing signal generated by the earthquake sensor is out of the allowable earthquake sensitivity range,
count the number of times that the earthquake sensitivity determined based on the earthquake sensing signal generated by the earthquake sensor is out of the allowable earthquake sensitivity range, and
generate the cut-off signal when the number of times is greater than a preset number of times.

12. The boiler according to claim 2, wherein the controller is configured to
compare whether or not the earthquake sensitivity determined based on the earthquake sensing signal generated by the earthquake sensor is out of the allowable earthquake sensitivity range, and
generate the cut-off signal when a situation that the earthquake sensitivity determined based on the earthquake sensing signal generated by the earthquake sensor is out of the allowable earthquake sensitivity range lasts for a preset period of time.

13. The boiler according to claim 2, wherein the controller is configured to transmit the cut-off signal to a room temperature controller that is installed in a room to control a temperature of the boiler body.

14. The boiler according to claim 2, wherein the earthquake sensor includes a 3-axis acceleration sensor.

* * * * *